United States Patent
Thatcher et al.

(10) Patent No.: US 11,720,554 B2
(45) Date of Patent: Aug. 8, 2023

(54) ITERATIVE QUERY EXPANSION FOR DOCUMENT DISCOVERY

(71) Applicant: INTERNATIONAL BUSINESS MACHINES CORPORATION, Armonk, NY (US)

(72) Inventors: Sean Thomas Thatcher, Stone Ridge, VA (US); Edward Graham Katz, Washington, DC (US); Charles E. Beller, Baltimore, MD (US); John A. Riendeau, Madison, WI (US); Kristen Maria Summers, Takoma Park, MD (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 120 days.

(21) Appl. No.: 17/142,491

(22) Filed: Jan. 6, 2021

(65) Prior Publication Data

US 2022/0215018 A1 Jul. 7, 2022

(51) Int. Cl.
*G06F 16/242* (2019.01)
*G06F 16/2457* (2019.01)
*G06F 16/93* (2019.01)

(52) U.S. Cl.
CPC .... *G06F 16/2425* (2019.01); *G06F 16/24578* (2019.01); *G06F 16/93* (2019.01)

(58) Field of Classification Search
CPC .. G06F 16/2425; G06F 16/93; G06F 16/2478; G06F 16/24578
See application file for complete search history.

(56) References Cited

U.S. PATENT DOCUMENTS 8,280,900 B2    10/2012  Pickens
2008/0154873 A1*  6/2008  Redlich ................ G06F 16/951
                                                707/999.005

(Continued)

OTHER PUBLICATIONS

Buey et al., "An approach for automatic query expansion based on NLP and semantics," Database and Expert Systems Applications: 25th International Conference, DEXA 2014, Munich, Germany, Sep. 2014. Proceedings, Part II, http://ra.cps.unizar.es:8080/PUBLICATIONS/attachedFiles/document/DEXA2014.pdf, 9 pages.

(Continued)

*Primary Examiner* — Kannan Shanmugasundaram
(74) *Attorney, Agent, or Firm* — Robert R. Aragona

(57) ABSTRACT

An embodiment for expanding a search query is provided. The embodiment may include receiving a stopping criterion for stopping a search. The embodiment may also include receiving an initial search query. The embodiment may further include submitting the initial search query to an information retrieval system. The embodiment may also include identifying enrichment terms from the retrieved initial set of documents. The embodiment may further include generating a subsequent search query that includes one or more enrichment terms from the retrieved initial set of documents. The embodiment may also include submitting the subsequent search query to the information retrieval system. The embodiment may further include determining whether the stopping criterion is met, and in response to determining the stopping criterion is not met, iterating identifying, generating, submitting steps until the stopping criterion is met.

20 Claims, 6 Drawing Sheets

(56) References Cited

U.S. PATENT DOCUMENTS

2013/0179420 A1\* 7/2013 Park .................. G06F 16/9535
  707/706
2018/0293235 A1 10/2018 Ryger

OTHER PUBLICATIONS

De Vocht et al.' "Iterative Query Refinement for Exploratory Search in Distributed Heterogeneous Linked Data," (2015) Doctoral Consortium at the 14th International Semantic Web Conference, Proceedings, 9 pages.

Kurland et al., "Better than the Real Thing? Iterative Pseudo-Query Processing using Cluster-Based Language Models," arXiv:cs/0601046v1 [cs.IR] Jan. 11, 2006, https://arxiv.org/pdf/cs/0601046.pdf, 8 pages.

Mell et al., "The NIST Definition of Cloud Computing", National Institute of Standards and Technology, Special Publication 800-145, Sep. 2011, 7 pages.

Singh et al., "Iterative Search using Query Aspects," CIKM '16, Oct. 24-28, 2016, Indianapolis, IN, USA, DOI: http://dx.doi.org/10.1145/2983323.2983903, 4 pages.

\* cited by examiner

ITERATIVE QUERY EXPANSION FOR DOCUMENT DISCOVERY

BACKGROUND

The present invention relates generally to the field of computing, and more particularly to a system for iterative, corpus-driven query expansion.

Query expansion relates to the field of retrieving a set of documents related to an initial search query, where the initial search query contains certain keywords, and then expanding the initial search query to include other keywords found in the set of retrieved documents. In this manner, a subsequent search query may retrieve additional documents to those found in a previous search query. This process may be performed in an iterative fashion, with each iteration adding more documents to the document set. Different communities of authors may write about the same core topic, but may use community specific vocabulary. These communities may be separated geographically or the authors may be writing from the viewpoints of neighboring disciplines while focusing on a topic that is shared. For example, psychology and neurology are neighboring disciplines within the shared topic of medicine. Query expansion therefore allows for documents from neighboring disciplines or different geographical areas to be rendered together from the initial search query.

SUMMARY

According to one embodiment, a method, computer system, and computer program product for expanding a search query is provided. The embodiment may include receiving a stopping criterion for stopping a search. The embodiment may also include receiving an initial search query. The embodiment may further include submitting the initial search query to an information retrieval system. The information retrieval system may retrieve an initial set of documents responsive to the initial search query. The embodiment may also include identifying enrichment terms from the retrieved initial set of documents. The embodiment may further include generating a subsequent search query that includes one or more enrichment terms from the retrieved initial set of documents. The embodiment may also include submitting the subsequent search query to the information retrieval system. The information retrieval system may retrieve a subsequent set of documents responsive to the subsequent search query. The embodiment may further include determining whether the stopping criterion is met. If the stopping criterion is not met, identifying, generating, and submitting steps may be iterated until the stopping criterion is met. The identifying step may include identifying updating enrichment terms from the set of documents retrieved in a most recent previous search query. The generating step may include generating a new search query that includes enrichment terms from a most recent previous set of documents. The submitting step may include submitting the new search query to the information retrieval system to retrieve another set of documents responsive to the new search query. If the stopping criterion is met, high-leverage query terms in the new search query may be identified.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
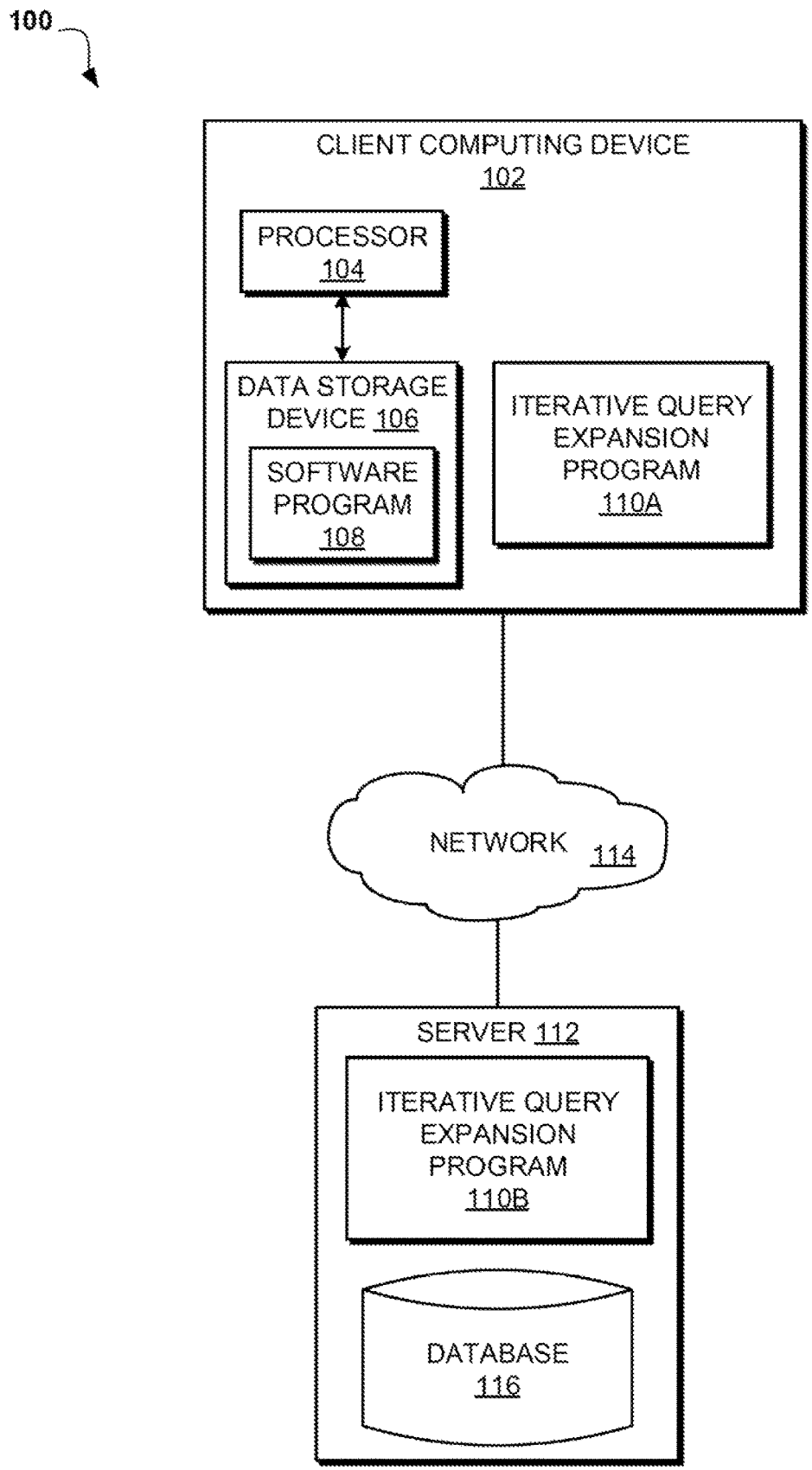
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to a system for iterative, corpus-driven query expansion. The following described exemplary embodiments provide a system, method, and program product to, among other things, expand an initial search query by incorporating enrichment terms and, accordingly, retrieve a full set of documents relevant to the initial search query. As used herein, "enrichment terms" may include, but are not limited to, discovered entities, keywords, concepts, and topics. Therefore, the present embodiment has the capacity to improve the technical field of iterative, corpus-driven query expansion by automatically expanding the initial search query in an iteratively cumulative or non-cumulative fashion to generate a maximum number of relevant documents.

As previously described, query expansion relates to the field of retrieving a set of documents related to an initial search query, where the initial search query contains certain keywords, and then expanding the initial search query to include other keywords found in the set of retrieved documents. In this manner, a subsequent search query may retrieve additional documents to those found in a previous search query. This process may be performed in an iterative fashion, with each iteration adding more documents to the document set. Different communities of authors may write about the same core topic, but may use community specific vocabulary. These communities may be separated geographically or the authors may be writing from the viewpoints of neighboring disciplines while focusing on a topic that is shared. For example, psychology and neurology are neighboring disciplines within the shared topic of medicine. Query expansion therefore allows for documents from neighboring disciplines or different geographical areas to be rendered together from the initial search query. A user querying for a set of documents may be limited in their vocabulary as a result of incomplete knowledge of the variety of communities that have written on the topic of interest. As a result, documents from unfamiliar communities which contain valuable information may be overlooked. However, the overlooked documents may include known terms and concepts that relate to other documents with new, unknown terms and concepts. This problem is typically addressed by adding entire documents to the initial search query or foregoing an iterative expansion strategy altogether. Adding entire documents to the initial search query may result in a cluttered query, and the results generated may include numerous as well as irrelevant documents. Additionally, a single expansion of the initial search query may not generate the maximum number of relevant documents. It may therefore be imperative to have a system in place to take the initial search query from the user and iteratively expand that search query in order to retrieve the full set of documents addressing the topic of interest, regardless of community specific vocabulary. Thus, embodiments of the present invention may provide advantages including, but not limited to, utilizing enrichment terms to expand the initial search query cumulatively or non-cumulatively, retrieving all documents relevant to the initial search query regardless of community specific vocabulary, and identifying high-leverage query terms in the expansions of each search query.

According to at least one embodiment, the stopping criterion for stopping a search may be received by the system. The initial search query containing keywords on a topic or subject may be received from the user. The initial search query may be submitted to a search and retrieval system, i.e., an information retrieval (IR) system such as a search engine, which may access a corpus of documents. The search and retrieval system may retrieve the initial set of documents from the corpus of documents. The enrichment terms may be identified from the initial set of documents. The subsequent search query may be generated that includes the one or more enrichment terms from the retrieved initial set of documents. The subsequent search query may be submitted to the search and retrieval system to retrieve the subsequent set of documents. If the system determines the stopping criterion is not met, the process may iterate identifying, generating, and submitting steps until the stopping criterion is met. The identifying step may include identifying the updating enrichment terms from the set of documents retrieved in the most recent previous search query. The generating step may include generating the new search query that includes enrichment terms from the most recent previous set of documents. The submitting step may include submitting the new search query to the information retrieval system to retrieve another set of documents responsive to the new search query. If the system determines the stopping criterion is met, the high-leverage query terms in the new search query may be identified. As used herein, "high-leverage query terms" may include, but are not limited to, terms resulting in an increase in the subsequent set of documents retrieved after each iteration, an increase in the number of document click-throughs by the user, and an increase in the number of novel document click-throughs by the user.

According to at least one other embodiment, the expanded search query may be one or more cumulatively expanded search queries, i.e., the subsequent query may include more enrichment terms than the previous search query. Where the iterations of the expanded search query are cumulative, a check that a given sequence of queries moves toward convergence may be performed. A fixed sequence length of a plurality of cumulatively expanded search queries may be identified, and a consecutive sequence of the plurality of cumulatively expanded search queries may be executed. A number or ratio of additional documents retrieved from each subsequent cumulatively expanded search query may be identified. If the system determines the number or ratio of novel documents grows monotonically above a rate threshold, the sequence may be deemed a non-converging sequence and the cumulative expansion of the expanded search query may be discontinued.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to expand the initial search query by incorporating enrichment terms and retrieve the full set of documents that are relevant to the initial search query.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and an iterative query expansion program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 302a and external components 304a, respectively.

The server computer 112 may be a laptop computer, netbook computer, personal computer (PC), a desktop computer, or any programmable electronic device or any network of programmable electronic devices capable of hosting and running an iterative query expansion program 110B and a database 116 and communicating with the client computing device 102 via the communication network 114, in accordance with embodiments of the invention. As will be discussed with reference to FIG. 4, the server computer 112 may include internal components 302b and external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the iterative query expansion program 110A, 110B may be a program capable of utilizing enrichment terms to expand the initial search query cumulatively or non-cumulatively, retrieving all documents relevant to the initial search query regardless of community specific vocabulary, and identifying high-leverage query terms in the expansions of each search query. The iterative search query expansion method is explained in further detail below with respect to FIGS. 2 and 3.

Figure 2:
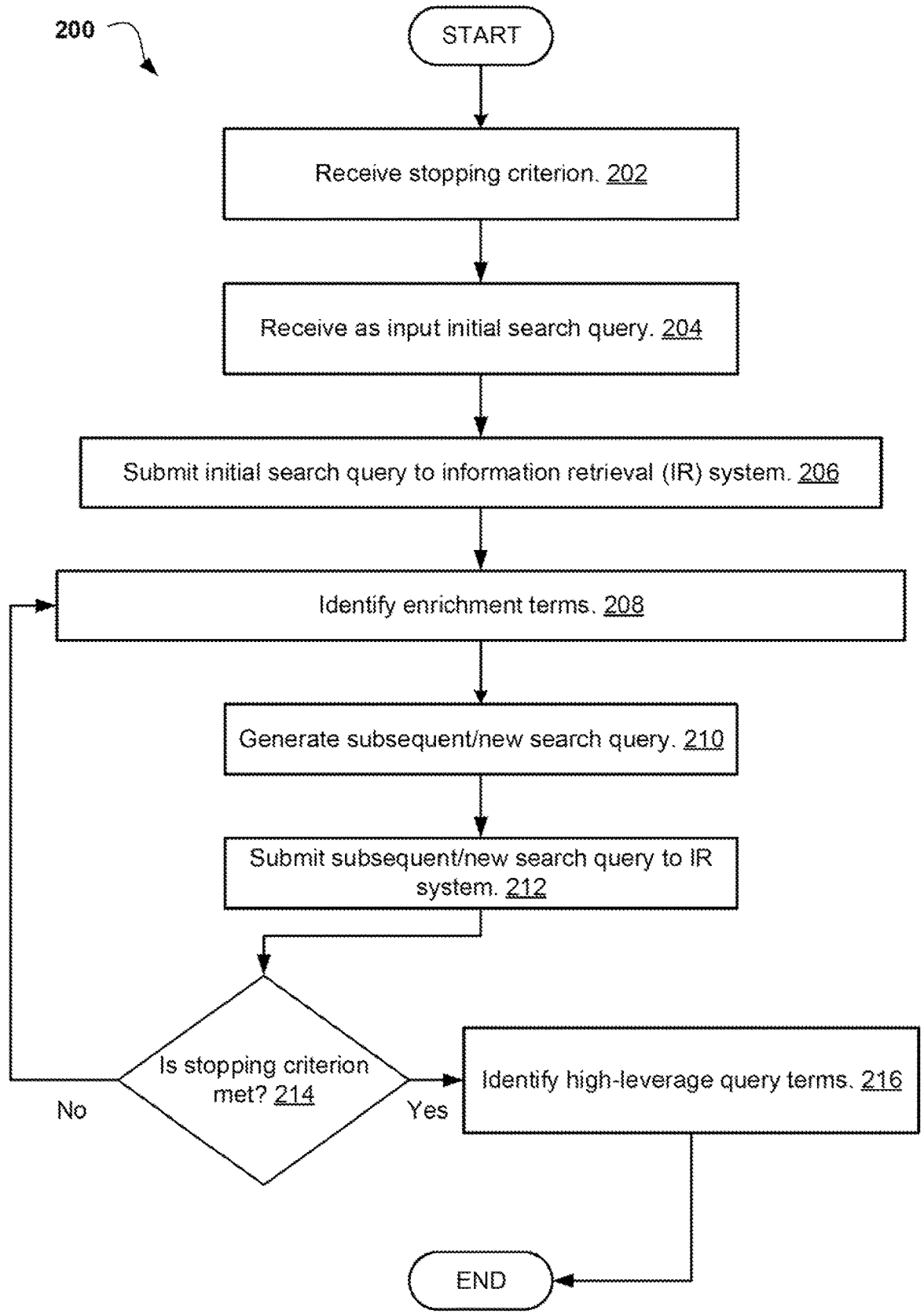
FIG. 2 illustrates an operational flowchart for iteratively expanding a search query in an iterative search query expansion process according to at least one embodiment.

Referring now to FIG. 2, an operational flowchart for iteratively expanding a search query in an iterative search query expansion process 200 is depicted according to at least one embodiment. At 202, the iterative query expansion program 110A, 110B receives the stopping criterion for stopping the search from the user. Details on the stopping criterion are described in detail below with respect to step 214.

At 204, the iterative query expansion program 110A, 110B receives the initial search query. The initial search query may contain keywords on the topic or subject received from the user. For example, the keyword "heart" may be submitted for the topic of cardiology. The initial search query, $Q_0$, may be a first search query in a series of search queries $Q_1$-$Q_k$ for some value of k. The subsequent search query may use the enrichment terms based on a result from a most recent previous search query. For example, search query $Q_2$ may contain the keywords "ventricle" and "aorta" if those keywords were found in the retrieved subsequent set of documents from search query $Q_1$.

Then, at 206, the iterative query expansion program 110A, 110B submits the initial search query to the IR system. The iterative query expansion program 110A, 110B may utilize an application programming interface (API) in order to submit the initial search query to the IR system. The API may be a software intermediary that sends a request to a provider and delivers a response. The IR system may access the corpus of documents and may retrieve the initial set of documents from the corpus of documents responsive to the initial search query.

Next, at 208, the iterative query expansion program 110A, 110B identifies the enrichment terms from the initial set of documents. As described above, "enrichment terms" may include, but are not limited to, discovered entities, keywords, concepts, and topics. The iterative query expansion program 110A, 110B may utilize one or more natural language processing tools to identify the enrichment terms. The top N documents, where N is a number of documents, may be selected based on their relevance to any search query, such as the initial search query, the subsequent search query, and/or the new search query. Document relevance may be determined by how well each document matches any search query. Upon at least one iteration, the iterative query expansion program 110A, 110B may identify the updated enrichment terms from the set of documents retrieved in the most recent previous set of documents. Each document may be ranked by a term frequency-inverse document frequency (TF-IDF) score. For example, the top ten documents with the highest TF-IDF score may be selected by the iterative query expansion program 110A, 110B.

Then, at 210, the iterative query expansion program 110A, 100B generates the subsequent search query that includes the one or more enrichment terms from the retrieved initial set of documents. The one or more enrichment terms may be ranked by an enrichment relevance score. Relevant enrichment terms may include the enrichment terms which best capture the user's intention. The one or more enrichment terms receiving an enrichment relevance score above a pre-determined threshold may be added to the initial search query to generate the subsequent search query. For example, on a scale of 1-10, relevant enrichment terms, such as proper nouns, receiving a score above six may be added to the initial search query. Upon at least one iteration, the iterative query expansion program 110A, 110B may generate the new search query that includes enrichment terms from the most recent previous set of documents. These enrichment terms may also be ranked by an enrichment relevance score as described above. Upon at least one iteration, the new search query may include enrichment terms different from the enrichment terms from the most recent previous set of documents. According to at least one other embodiment, the user may manually set the pre-determined threshold.

In the present embodiment, at 212, the iterative query expansion program 110A, 110B submits the subsequent search query to the IR system. The iterative query expansion program 110A, 110B may utilize the API as described above to submit the expanded search query to the IR system. The IR system may retrieve the subsequent set of documents responsive to the subsequent search query. Upon at least one iteration, the iterative query expansion program 110A, 110B may submit the new search query to the IR system to retrieve another set of documents responsive to the new search query.

Next, at 214, the iterative query expansion program 110A, 110B determines whether the stopping criterion is met. The stopping criterion may be met in the following scenarios.

According to at least one embodiment, the stopping criterion may be the number of identified enrichment terms from the retrieved initial set of documents. In this instance, the number of identified enrichment terms from the retrieved initial set of documents may be the total number of iterations. For example, if five enrichment terms $T_1$-$T_5$ were identified in the initial set of documents, five additional search queries may be submitted to the IR system, where each search query contains the search terms of the initial search query and one enrichment term. Continuing the example, the search terms of the initial search query $Q_0$ and enrichment term $T_1$ may be included in the first iteration, $Q_0$ and $T_2$ may be included in the second iteration, $Q_0$ and $T_3$ may be included in the third iteration, $Q_0$ and $T_4$ may be included in the fourth iteration, and $Q_0$ and $T_5$ may be included in the fifth iteration.

According to at least one other embodiment, the stopping criterion may be met when the identified updated enrichment terms from the most recent previous search query match the enrichment terms of the new search query. For example, if five enrichment terms $T_1$-$T_5$ were identified in the initial set of documents, the first iteration may include the search terms of the initial search query $Q_0$ and the enrichment terms $T_1$-$T_5$. Continuing the example, if the first iteration retrieves a set of documents where two additional enrichment terms are identified, e.g., $T_6$-$T_7$, then the second iteration may include the search terms of the initial search query $Q_0$ and the enrichment terms $T_6$-$T_7$. This process may continue until no additional enrichment terms are identified. For example, if the search query submitted to the IR system containing the initial search query $Q_0$ and enrichment terms $T_6$-$T_7$ generates the same enrichment terms, i.e., enrichment terms $T_6$-$T_7$, then the stopping criterion may be met.

According to at least one other embodiment, the stopping criterion may be manually set by the user, i.e., the user may manually set the number of iterations. For example, the user may set the number at a total of eight iterations.

In the present embodiment, if the iterative query expansion program 110A, 110B determines the stopping criterion is met, the iterative search query expansion process 200 may proceed to step 216 to identify the high-leverage query terms. To test the efficacy of the iterative query expansion program 110A, 110B, the user may manually run a finite number of iterations, e.g., two iterations, as a check of whether a significantly expanded, yet still relevant, set of documents are retrieved.

According to at least one other embodiment, each iteration of the subsequent search query is one or more cumulatively expanded search queries of the subsequent search query, i.e., the subsequent query may include more enrichment terms than the most recent previous search query. Details on determining whether a sequence of cumulative search queries moves toward convergence in an iterative search query expansion process are explained in further detail below with respect to FIG. 3.

In the present embodiment, at 216, the iterative query expansion program 110A, 110B identifies the high-leverage query terms. The high-leverage query terms may be identified in the new search query. The high-leverage query terms may be identified by comparing a final full set of documents with the initial set of documents. High-leverage query terms may be the enrichment terms resulting in an increase in the subsequent set of documents retrieved after each iteration, an increase in the number of document click-throughs by the user, and an increase in the number of novel document click-throughs by the user. For example, if the enrichment term "heart" generates five more novel documents from $Q_4$ than the number of novel documents from $Q_3$, "heart" may be identified as a high-leverage query term. If the corpus of documents includes a bibliographic network, introduction of novel but partially connected authors, or introduction of entirely new sections of the network, may add a bonus for the enrichment term. For example, if the enrichment term "heart" retrieves articles written by two distinct cardiologists, the bonus may be added to "heart." The identified high-leverage query terms may be presented to the user and stored in a database for future iterative query expansions. The future iterative query expansions may either be automatic, as described above, or semi-automatic, where the user may be presented the high-leverage query terms and manually input those terms into the initial search query.

Figure 3:
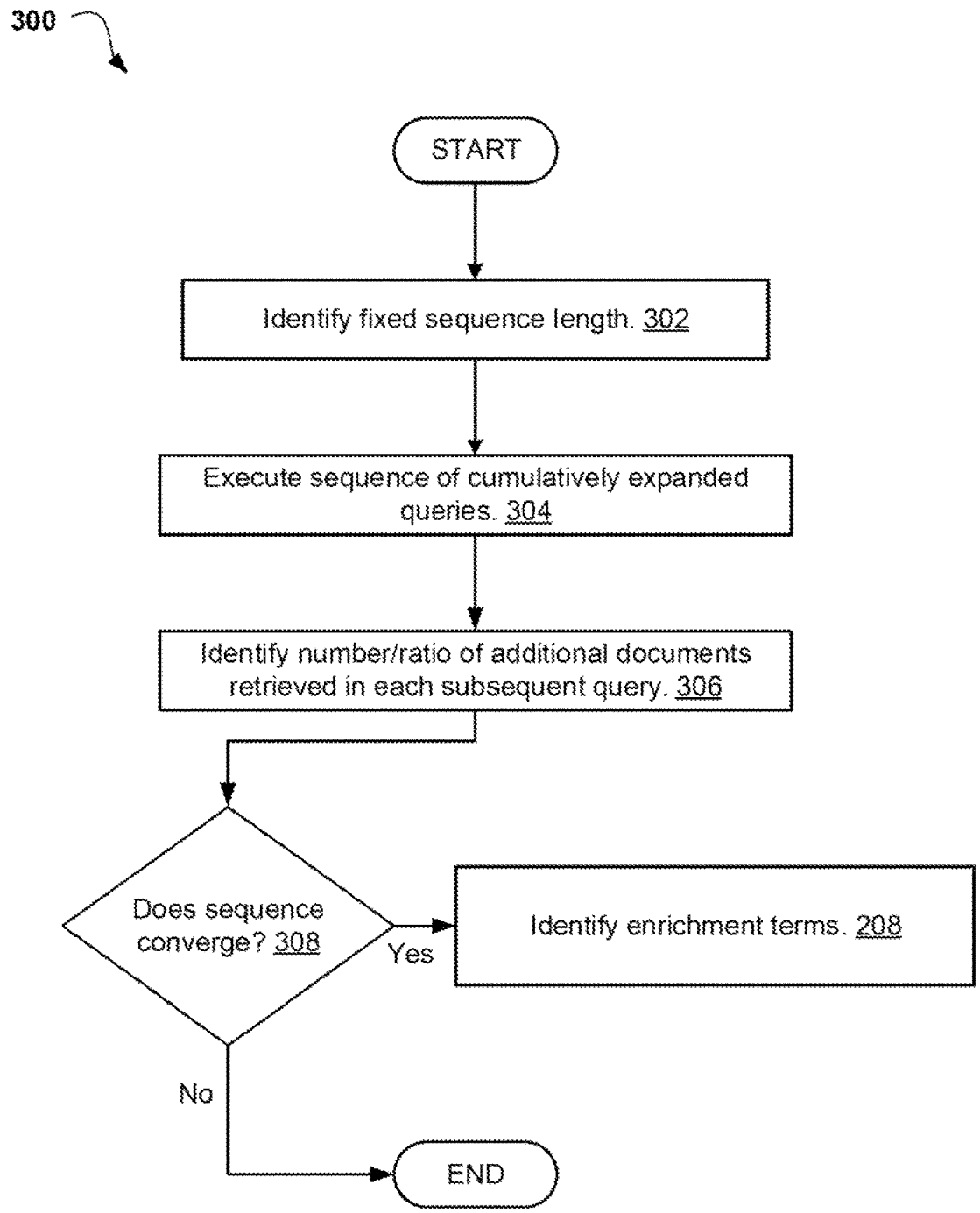
FIG. 3 illustrates an operational flowchart for determining whether a sequence of cumulative search queries moves toward convergence in an iterative search query expansion process according to at least one embodiment.

Referring now to FIG. 3, an operational flowchart for determining whether a sequence of cumulative queries moves toward convergence in an iterative search query expansion process 300 is depicted according to at least one embodiment. At 302, the iterative query expansion program 110A, 110B identifies the fixed sequence length of the plurality of cumulatively expanded search queries. For example, the sequence may be set to five cumulative expansions.

Then, at 304, the iterative query expansion program 110A, 110B executes the consecutive sequence of the plurality of cumulatively expanded search queries. As described in the example above, the five cumulative expansions may be executed, whereby each subsequent expansion contains more enrichment terms than the most recent previous expansion. Therefore, in the example above, the fifth expansion would have the greatest number of enrichment terms.

Next, at 306, the iterative query expansion program 110A, 110B identifies the number of additional documents retrieved from each subsequent cumulatively expanded search query. For example, cumulative expansion $Q_3$ may retrieve four additional documents to those retrieved from cumulative expansion $Q_2$. According to at least one other embodiment, the iterative query expansion program 110A, 110B may identify a ratio of novel documents to previously found documents for each subsequent search query. For example, if $Q_3$ retrieves four additional documents, and the total number of documents retrieved from $Q_2$ and $Q_3$ is 20 documents, then 4/20, i.e., 0.2, may be identified as the ratio.

In the present embodiment, at 308, the iterative query expansion program 110A, 110B determines whether the retrieved additional documents and the retrieved most recent previous set of documents converge. The determination may be made based on whether the retrieved most recent previous set of documents and the retrieved additional documents from some previous search query $Q_{(k-1)}$ and subsequent search query $Q_k$ are deemed by the iterative query expansion program 110A, 110B to be a stable set of documents. The retrieved most recent previous set of documents from $Q_{(k-1)}$ and the retrieved additional documents from $Q_k$ may be deemed stable when the retrieved most recent previous set of documents and the retrieved additional documents are identical, substantially similar, or unlikely to converge. For example, the retrieved most recent previous set of documents and the retrieved additional documents may be substantially similar when the number of novel documents generated between $Q_3$ and $Q_4$ is a finite number of novel documents, e.g., three novel documents. However, the cumulatively expanded sequence of search queries may be a non-converging sequence. The cumulatively expanded sequence of search queries may be deemed a non-converging sequence when the number, or alternatively the ratio, of novel documents grows monotonically above a pre-determined rate threshold. The pre-determined rate threshold may be based on a percentage of novel documents retrieved. For example, if the pre-determined rate threshold is ten percent, and cumulative expansion $Q_5$ retrieves ten additional documents to those retrieved in cumulative expansion $Q_4$, and the total number of additional documents retrieved from $Q_5$ and $Q_4$ is 20, then 10/20, i.e., 50%, the sequence from $Q_4$ to $Q_5$ may be deemed a non-converging sequence. If the iterative query expansion program 110A, 110B determines the retrieved additional documents and the most recent previous set of documents do not converge, the iterative search query expansion process 300 may discontinue expansion. If the iterative query expansion program 110A, 110B determines the retrieved additional documents and the most recent previous set of documents converge, the iterative search query expansion process 300 may proceed to step 208 to identify the enrichment terms. For non-converging sequences, there may be a non-zero likelihood that later retrieved documents may be more irrelevant than earlier retrieved documents. Therefore, in non-converging sequences, the later retrieved documents may be presented to the user after the earlier retrieved documents.

It may be appreciated that FIGS. 2 and 3 provide only an illustration of one implementation and do not imply any limitations with regard to how different embodiments may be implemented. Many modifications to the depicted environments may be made based on design and implementation requirements.

Figure 4:
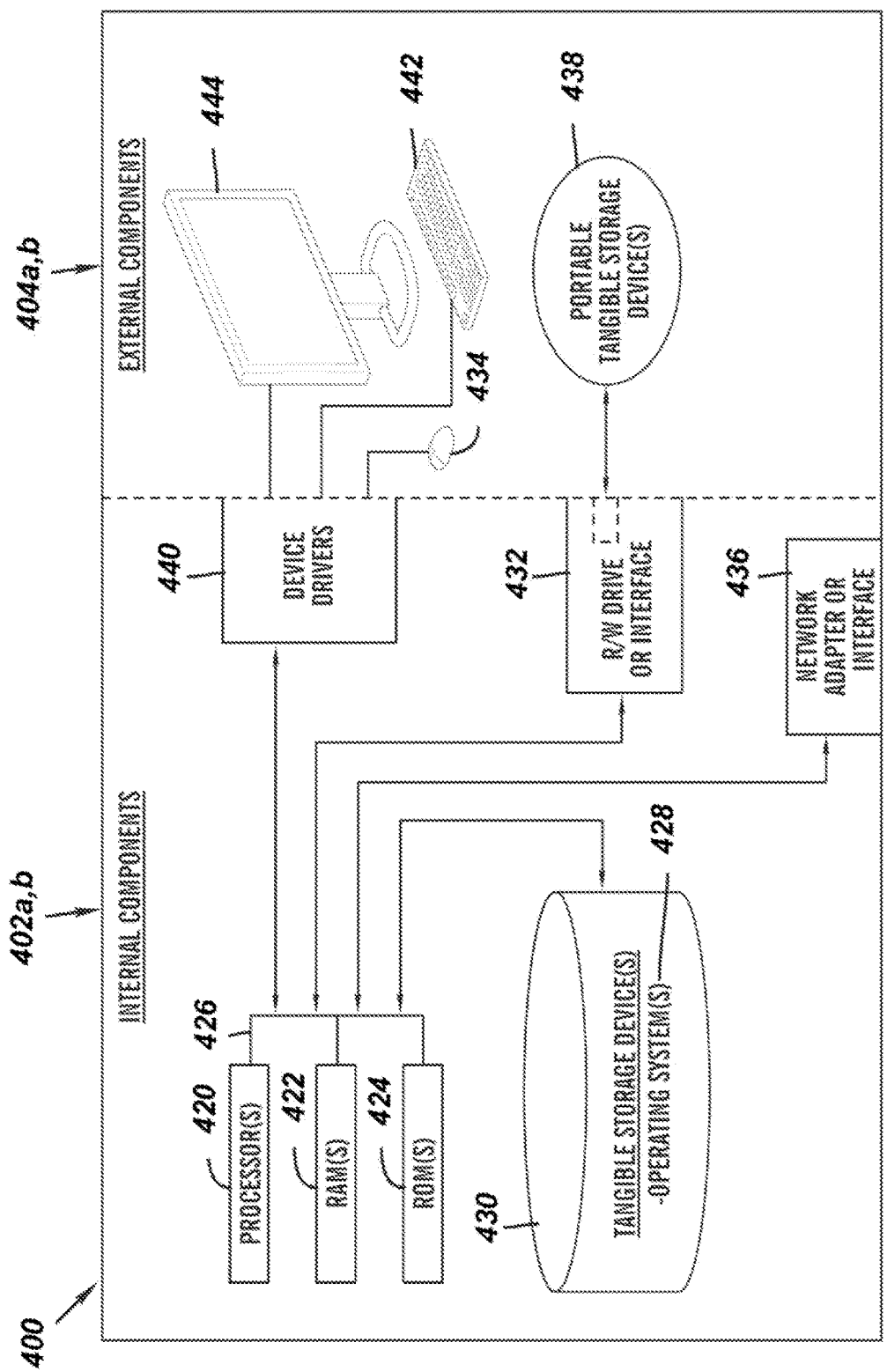
FIG. 4 is a functional block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may be represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 a,b and external components 404 a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the iterative query expansion program 110A in the client computing device 102 and the iterative query expansion program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the iterative query expansion program 110A, 110B, can be stored on one or more of the respective portable computer-readable tangible storage devices 438, read via the respective R/W drive or interface 432, and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. The software program 108 and the iterative query expansion program 110A in the client computing device 102 and the iterative query expansion program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the iterative query expansion program 110A in the client computing device 102 and the iterative query expansion program 110B in the server 112 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
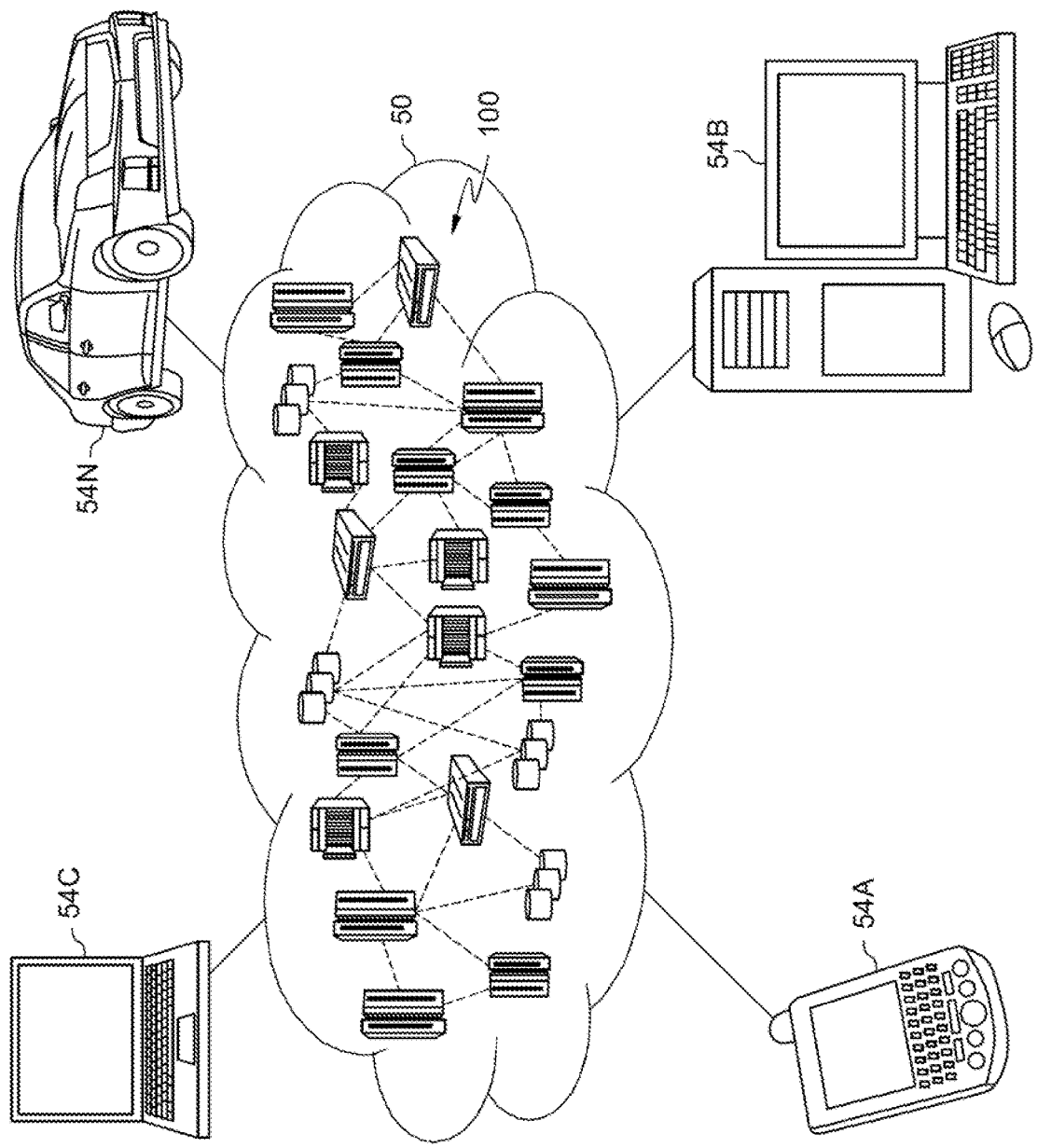
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
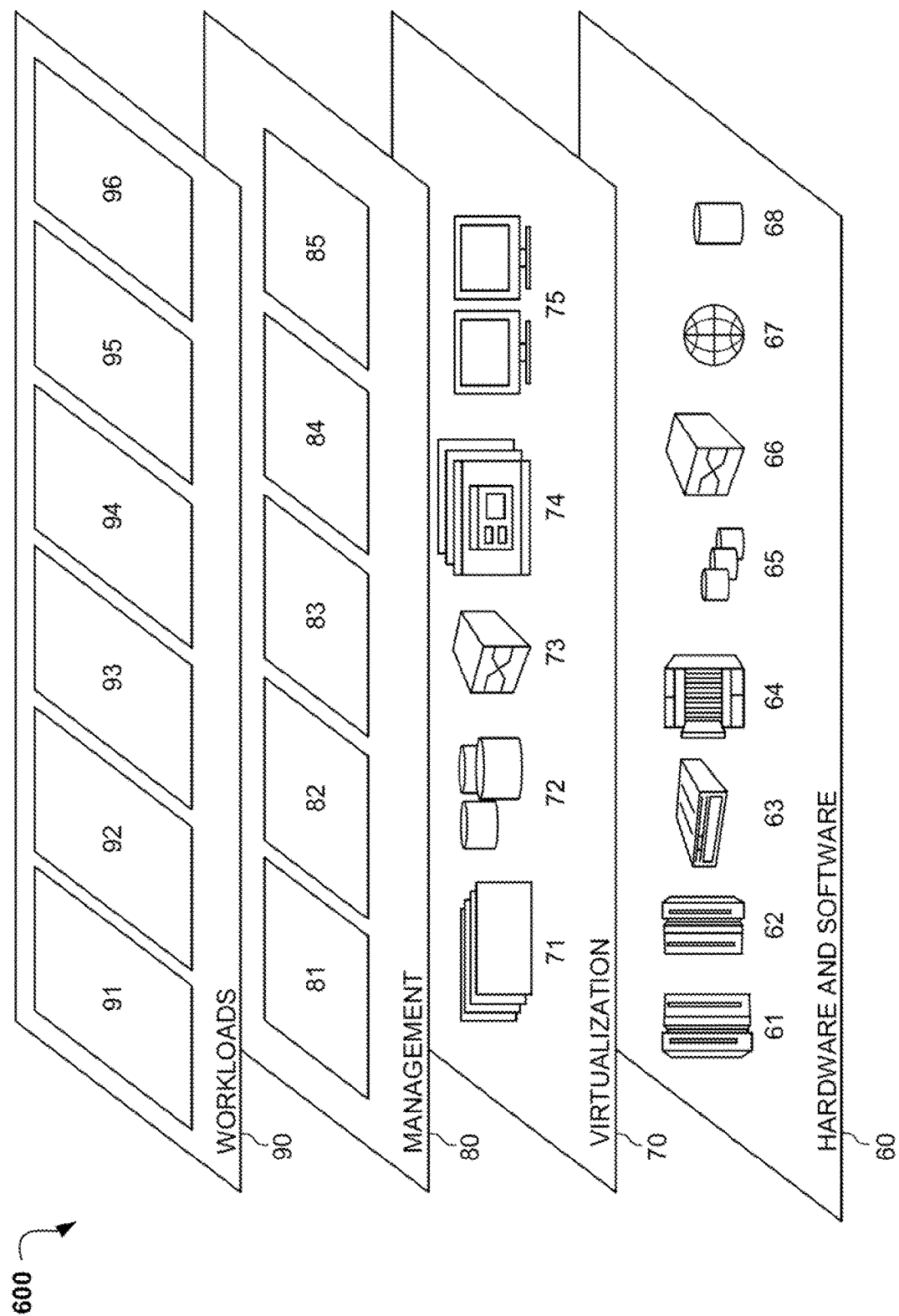
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and iterative query expansion for document discovery 96. Iterative query expansion for document discovery 96 may relate to expanding the initial search query by incorporating enrichment terms in order to retrieve the full set of documents relevant to the initial search query.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of expanding a search query, the method comprising:
  receiving an initial search query and a stopping criterion for stopping a search;
  submitting the initial search query to an information retrieval system, the information retrieval system retrieving an initial set of documents responsive to the initial search query;

identifying enrichment terms from the retrieved initial set of documents;
generating a subsequent search query that includes one or more enrichment terms from the retrieved initial set of documents;
submitting the subsequent search query to the information retrieval system, the information retrieval system retrieving a subsequent set of documents responsive to the subsequent search query;
determining whether the stopping criterion is met, wherein the stopping criterion is the number of identified enrichment terms from the retrieved initial set of documents, wherein the number of identified enrichment terms from the retrieved initial set of documents is equivalent to the number of iterations, and wherein each search query contains search terms of the initial search query and one enrichment term; and
in response to determining the stopping criterion is not met, iterating, until the stopping criterion is met:
identifying updated enrichment terms from the set of documents retrieved in a most recent previous search query;
generating a new search query that includes enrichment terms from a most recent previous set of documents; and
submitting the new search query to the information retrieval system to retrieve another set of documents responsive to the new search query.

2. The method of claim 1, further comprising:
in response to determining the stopping criterion is met, identifying high-leverage query terms in the new search query.

3. The method of claim 2, wherein the new search query has one or more of the following characteristics:
a set of enrichment terms different from the enrichment terms from the most recent previous set of documents; and
a set of enrichment terms ranked by an enrichment relevance score.

4. The method of claim 1, wherein the stopping criterion is selected from a group consisting of manually set by a user, and the identified updated enrichment terms from the most recent previous search query match the enrichment terms of the new search query.

5. The method of claim 1, wherein each iteration of the subsequent search query is one or more cumulatively expanded search queries of the subsequent search query.

6. The method of claim 5, wherein each iteration of the one or more cumulatively expanded search queries further comprises:
identifying a fixed sequence length of a plurality of cumulatively expanded search queries;
executing a consecutive sequence of the plurality of cumulatively expanded search queries;
identifying a number of additional documents retrieved from each subsequent cumulatively expanded search query;
determining whether the retrieved additional documents and the retrieved most recent previous set of documents converge; and
in response to determining the retrieved additional documents and the most recent previous set of documents do not converge, discontinuing the cumulative expansion of the one or more cumulatively expanded search queries.

7. The method of claim 1, wherein the enrichment terms are selected from a group consisting of discovered entities, keywords, concepts, and topics.

8. A computer system, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
receiving an initial search query and a stopping criterion for stopping a search;
submitting the initial search query to an information retrieval system, the information retrieval system retrieving an initial set of documents responsive to the initial search query;
identifying enrichment terms from the retrieved initial set of documents;
generating a subsequent search query that includes one or more enrichment terms from the retrieved initial set of documents;
submitting the subsequent search query to the information retrieval system, the information retrieval system retrieving a subsequent set of documents responsive to the subsequent search query;
determining whether the stopping criterion is met, wherein the stopping criterion is the number of identified enrichment terms from the retrieved initial set of documents, wherein the number of identified enrichment terms from the retrieved initial set of documents is equivalent to the number of iterations, and wherein each search query contains search terms of the initial search query and one enrichment term; and
in response to determining the stopping criterion is not met, iterating, until the stopping criterion is met:
identifying updated enrichment terms from the set of documents retrieved in a most recent previous search query;
generating a new search query that includes enrichment terms from a most recent previous set of documents; and
submitting the new search query to the information retrieval system to retrieve another set of documents responsive to the new search query.

9. The computer system of claim 8, further comprising:
in response to determining the stopping criterion is met, identifying high-leverage query terms in the new search query.

10. The computer system of claim 9, wherein the new search query has one or more of the following characteristics:
a set of enrichment terms different from the enrichment terms from the most recent previous set of documents; and
a set of enrichment terms ranked by an enrichment relevance score.

11. The computer system of claim 8, wherein the stopping criterion is selected from a group consisting of manually set by a user, and the identified updated enrichment terms from the most recent previous search query match the enrichment terms of the new search query.

12. The computer system of claim 8, wherein each iteration of the subsequent search query is one or more cumulatively expanded search queries of the subsequent search query.

13. The computer system of claim 12, wherein each iteration of the one or more cumulatively expanded search queries further comprises:
- identifying a fixed sequence length of a plurality of cumulatively expanded search queries;
- executing a consecutive sequence of the plurality of cumulatively expanded search queries;
- identifying a number of additional documents retrieved from each subsequent cumulatively expanded search query;
- determining whether the retrieved additional documents and the retrieved most recent previous set of documents converge; and
- in response to determining the retrieved additional documents and the most recent previous set of documents do not converge, discontinuing the cumulative expansion of the one or more cumulatively expanded search queries.

14. The computer system of claim 8, wherein the enrichment terms are selected from a group consisting of discovered entities, keywords, concepts, and topics.

15. A computer program product, the computer program product comprising:
- one or more computer-readable storage medium and program instructions stored on at least one of the one or more storage medium, the program instructions executable by a processor capable of performing a method, the method comprising:
  - receiving an initial search query and a stopping criterion for stopping a search;
  - submitting the initial search query to an information retrieval system, the information retrieval system retrieving an initial set of documents responsive to the initial search query;
  - identifying enrichment terms from the retrieved initial set of documents;
  - generating a subsequent search query that includes one or more enrichment terms from the retrieved initial set of documents;
  - submitting the subsequent search query to the information retrieval system, the information retrieval system retrieving a subsequent set of documents responsive to the subsequent search query;
  - determining whether the stopping criterion is met, wherein the stopping criterion is the number of identified enrichment terms from the retrieved initial set of documents, wherein the number of identified enrichment terms from the retrieved initial set of documents is equivalent to the number of iterations, and wherein each search query contains search terms of the initial search query and one enrichment term; and
  - in response to determining the stopping criterion is not met, iterating, until the stopping criterion is met:
    - identifying updated enrichment terms from the set of documents retrieved in a most recent previous search query;
    - generating a new search query that includes enrichment terms from a most recent previous set of documents; and
    - submitting the new search query to the information retrieval system to retrieve another set of documents responsive to the new search query.

16. The computer program product of claim 15, further comprising:
- in response to determining the stopping criterion is met, identifying high-leverage query terms in the new search query.

17. The computer program product of claim 16, wherein the new search query has one or more of the following characteristics:
- a set of enrichment terms different from the enrichment terms from the most recent previous set of documents; and
- a set of enrichment terms ranked by an enrichment relevance score.

18. The computer program product of claim 15, wherein the stopping criterion is selected from a group consisting of manually set by a user, and the identified updated enrichment terms from the most recent previous search query match the enrichment terms of the new search query.

19. The computer program product of claim 15, wherein each iteration of the subsequent search query is one or more cumulatively expanded search queries of the subsequent search query.

20. The computer program product of claim 19, wherein each iteration of the one or more cumulatively expanded search queries further comprises:
- identifying a fixed sequence length of a plurality of cumulatively expanded search queries;
- executing a consecutive sequence of the plurality of cumulatively expanded search queries;
- identifying a number of additional documents retrieved from each subsequent cumulatively expanded search query;
- determining whether the retrieved additional documents and the retrieved most recent previous set of documents converge; and
- in response to determining the retrieved additional documents and the most recent previous set of documents do not converge, discontinuing the cumulative expansion of the one or more cumulatively expanded search queries.

* * * * *